United States Patent [19]
Wildes et al.

[11] Patent Number: 5,572,596
[45] Date of Patent: Nov. 5, 1996

[54] AUTOMATED, NON-INVASIVE IRIS RECOGNITION SYSTEM AND METHOD

[75] Inventors: Richard P. Wildes; Jane C. Asmuth; Keith J. Hanna, all of Princeton; Stephen C. Hsu, East Windsor; Raymond J. Kolczynski, Trenton; James R. Matey, Hamilton Township, Mercer County; Sterling E. McBride, Lawrence Township, Mercer County, all of N.J.

[73] Assignee: David Sarnoff Research Center, Inc., Princeton, N.J.

[21] Appl. No.: 300,678

[22] Filed: Sep. 2, 1994

[51] Int. Cl.⁶ .................................................. G06K 9/00
[52] U.S. Cl. ............................................ 382/117; 382/190
[58] Field of Search .................................. 382/115, 117, 382/118, 240, 249, 190, 195, 199, 201, 203, 209, 217

[56] References Cited

U.S. PATENT DOCUMENTS

| | | | |
|---|---|---|---|
| 3,069,654 | 12/1962 | Hough | 340/146.3 |
| 4,109,237 | 8/1978 | Hill | 340/146.3 |
| 4,620,318 | 10/1986 | Hill | 382/2 |
| 4,641,349 | 2/1987 | Flom et al. | 382/2 |
| 4,692,806 | 9/1987 | Anderson et al. | 358/209 |
| 4,975,969 | 12/1990 | Tal | 382/117 |
| 5,008,946 | 4/1991 | Ando | 382/117 |
| 5,016,282 | 5/1991 | Tomono et al. | 382/2 |
| 5,063,603 | 11/1991 | Burt | 382/37 |
| 5,067,014 | 9/1987 | Bergen et al. | 358/105 |
| 5,179,441 | 1/1993 | Anderson et al. | 358/88 |
| 5,291,560 | 3/1994 | Daugman | 382/2 |
| 5,325,449 | 6/1994 | Burt et al. | 382/56 |

OTHER PUBLICATIONS

Daugman, "High Confidence Visual Recognition of Persons by a Test of Statistical Independence", IEEE Transactions on Pattern Analysis and Machine Intelligence, vol. 15, No. 11, pp.1148-1161, Nov. 1993.

Duda and Hart, "Pattern Classification And Scene Analysis", John Wiley & Sons, 1973, pp. 114–118. (New York).

Pentland et al., "A Practical Approach to Fractal-Based Image Compression", Proceedings of the DDC '91 Data Compression Conference, Apr. 8–11, 1991, IEEE Computer Society Press, Los Alamitos, CA. (pp. 176–185).

E. P. Simoncelli et al,in Chapter 4, "Subband Transforms" in Subband Image Coding, edited by John W. Woods, Kluwer Academic Publishers, Boston, 1991 (pp. 143–192).

*Primary Examiner*—Leo Boudreau
*Assistant Examiner*—Bijan Tadayon
*Attorney, Agent, or Firm*—W. J. Burke

[57] ABSTRACT

Iris recognition is achieved by (1) iris acquisition that permits a user to self-position his or her eye into an imager's field of view without the need for any physical contact, (2) spatially locating the data defining that portion of a digitized video image of the user's eye that defines solely the iris thereof without any initial spatial condition of the iris being provided, and (3) pattern matching the spatially located data defining the iris of the user's eye with stored data defining a model iris by employing normalized spatial correlation for first comparing, at each of a plurality of spatial scales, each of distinctive spatial characteristics of the respective irises that are spatially registered with one another to quantitatively determine, at each of the plurality of spatial scales, a goodness value of match at that spatial scale, and then judging whether or not the pattern which manifests solely the iris of the user's eye matches the digital data which manifests solely the model iris in accordance with a certain combination of the quantitatively-determined goodness values of match at each of said plurality of spatial scales.

32 Claims, 4 Drawing Sheets

AUTOMATED, NON-INVASIVE IRIS RECOGNITION SYSTEM AND METHOD

The United States Government has rights in this invention under a government contract.

The invention relates to a system and method for iris recognition.

BACKGROUND OF THE INVENTION

The prior art includes various technologies for uniquely identifying an individual person in accordance with an examination of particular attributes of either the person's interior or exterior eye. The prior art also includes a technology for eye tracking image pickup apparatus for separating noise from feature portions, such as that disclosed in U.S. Pat. No. 5,016,282, issued to Tomono et al. on May 14, 1991. One of these prior-art technologies involves the visual examination of the particular attributes of the exterior of the iris of at least one of the person's eyes. In this regard, reference is made to U.S. Pat. No. 4,641,349 issued to Flom et al. on Feb. 3, 1987, U.S. Pat. No. 5,291,560, issued to Daugman on Mar. 1, 1994, and to Daugman's article "High Confidence Visual Recognition of Persons by a Test of Statistical Independence", which appears on pages 1148–1161 of the IEEE Transactions on Pattern Analysis and Machine Intelligence, Volume 15, No. 11, Nov. 1993. As made clear by the aforesaid patents and article, the visible texture of a person's iris can be used to distinguish one person from another with great accuracy. Thus, iris recognition may be used for such purposes as controlling access to a secure facility or an Automated Transaction Machine (ATM) for dispensing cash, by way of examples. An iris recognition system involves the use of an imager to video image the iris of each person attempting access and computer-vision image processing means for comparing this iris video image with a reference iris image on file in a database. For instance, the person attempting access may first enter a personal identification number (PIN), thereby permitting the video image of the iris of that person to be associated with his or her reference iris image on file. In addition, an iris recognition system is useful for such purposes as medical diagnostics in the medical examination of the exterior eye.

From a practical point of view, there are problems with prior-art iris recognition systems and methods.

First, previous approaches to acquiring high quality images of the iris of the eye have: (i) an invasive positioning device (e.g., a head rest or bite bar) serving to bring the subject of interest into a known standard configuration; (ii) a controlled light source providing standardized illumination of the eye, and (iii) an imager serving to capture the positioned and illuminated eye. There are a number of limitations with this standard setup, including: (a) users find the physical contact required for positioning to be unappealing, and (b) the illumination level required by these previous approaches for the capture of good quality, high contrast images can be annoying to the user.

Second, previous approaches to localizing the iris in images of the eye have employed parameterized models of the iris. The parameters of these models are iteratively fit to an image of the eye that has been enhanced so as to highlight regions corresponding to the iris boundary. The complexity of the model varies from concentric circles that delimit the inner and outer boundaries of the iris to more elaborate models involving the effects of partially occluding eyelids. The methods used to enhance the iris boundaries include gradient based edge detection as well as morphological filtering. The chief limitations of these approaches include their need for good initial conditions that serve as seeds for the iterative fitting process as well as extensive computational expense.

Third, previous approaches to pattern match a localized iris data image derived from the video image of a person attempting to gain access with that of one or more reference localized iris data images on file in a database provide reasonable discrimination between these iris data images., but require extensive computational expense

SUMMARY OF THE INVENTION

The invention is directed to an improved system and method that provides a solution to disadvantages associated one or more of the aforesaid three approaches with prior-art iris recognition systems and methods.

The solution to the first of the aforesaid three approaches comprises a non-invasive alignment mechanism that may be implemented by a larger first edge and a smaller second edge having geometrically similar shapes that are substantially centered about and spaced at different distances from an imager lens to permit a user to self-position his or her eye into an imager's field of view without the need for any physical contact with the system by maneuvering his or her eye to that point in space where, due to perspective, the smaller edge substantially totally occludes the larger edge.

The solution to the second of the aforesaid three approaches comprises delimiting digital data to that portion of a digitized image of the eye of an individual that defines solely the iris of the eye of the individual by image-filtering at least one of the limbic boundary of the iris, the pupilary boundary of said iris, and the boundaries of said eye's upper and lower eyelids to derive an enhanced image thereof, and then histogramming the enhanced image by means that embody a voting scheme. This results in the recovery of the iris boundaries without requiring knowledge of any initial conditions other than the digital data representative of the individual's eye.

The solution to the third of the aforesaid three approaches comprises a pattern-matching technique for use in providing automated iris recognition for security access control. The pattern-matching technique, which is responsive to first digital data defining a digitized image of solely the iris of the eye of a certain individual attempting access and previously stored second digital data of a digitized image that defines solely the iris of the eye of a specified individual, employs normalized spatial correlation for first comparing, at each of a plurality of spatial scales, each of distinctive spatial characteristics of the respective irises of the given individual and the specified individual that are spatially registered with one another to quantitatively determine, at each of the plurality of spatial scales, a goodness value of match at that spatial scale. Whether or not the pattern of the digital data which manifests solely the iris of said eye of the given individual matches the digital data which manifests solely the iris of an eye of the specified individual is judged in accordance with a certain combination of the quantitatively-determined goodness values of match at each of the plurality of spatial scales.

DETAILED DESCRIPTION

Figure 1:
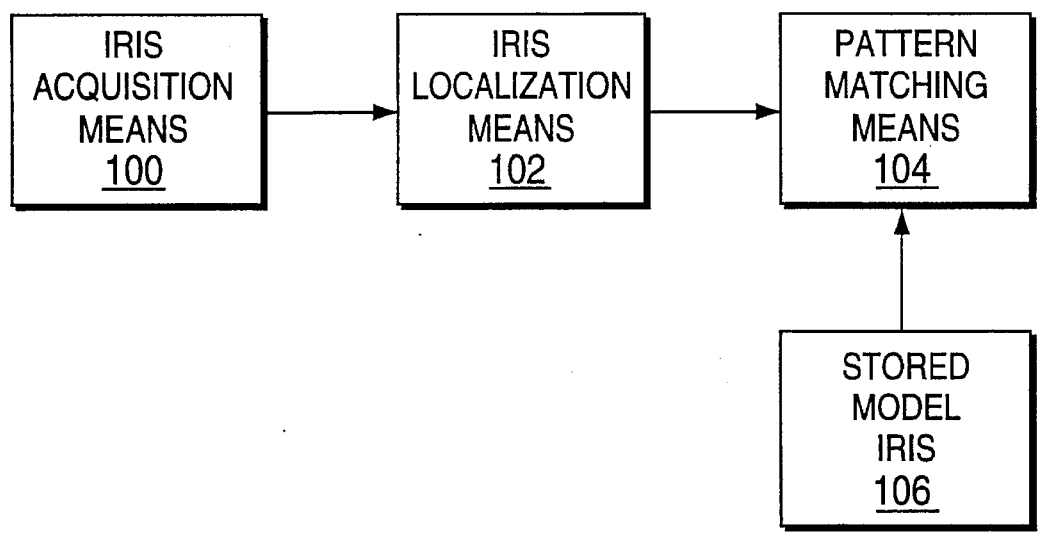
FIG. 1 is a functional block diagram of an automated, non-invasive iris recognition system incorporating the principles of the invention.

In FIG. 1, an automated, non-invasive iris recognition system of the invention comprises iris acquisition means 100 (shown in more detail in FIG. 2) for deriving an input image, typically a video image, of the iris of a person (hereafter referred to as the "user") attempting to be recognized by the system as being a certain predetermined person; iris localization means 102 (employing the computational steps shown in FIG. 3) for automatically processing an input image of an iris to provide complete localization of the video input image of the iris applied thereto from iris acquisition means 100; and pattern matching means 104 for automatically comparing the pattern of the localized iris information applied thereto from means 102 with the pattern of a stored model iris 106 of the certain predetermined person, and concluding with high accuracy whether the user is, in fact, the certain predetermined person.

Figure 2:
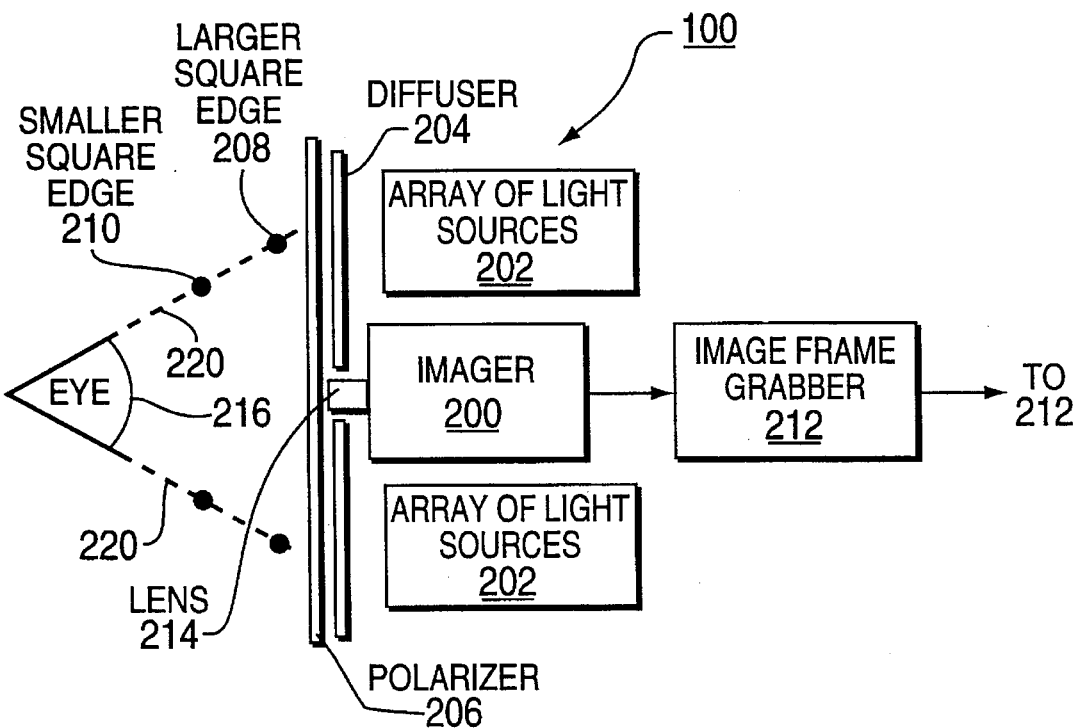
FIG. 2 illustrates an embodiment of iris acquisition means incorporating principles of the invention.

Iris acquisition means 100, as shown in FIG. 2, comprises imager 200, such as a video camera, an array of light sources 202, diffuser 204, circular polarizer 206, larger square edge 208, smaller square edge 210, and image frame grabber 212.

Imager 200 is typically a low light level video camera, such as a silicon intensified target (SIT) camera having an optical component comprising a telephoto/macro lens 214, which points through a hole in the center of diffuser 204 so that lens 214 does not interfere with imager 200 obtaining a clear image. Lens 214 permits a high resolution image to be obtained of an eye 216 of the user, who is positioned a substantial distance in front of lens 214, so that extreme proximity between eye 216 and imager 200 is not required.

Light from the array of light sources 202, which surround imager 200, passes through diffuser 204 and polarizer 206 to illuminate an eye 216 of the user who is positioned in front of polarizer 206. Diffuser 204 is a diffusing panel that operates as a first filter which serves the purposes of both providing uniform illumination of eye 216 and integrating radiant energy over a wide region at eye 216 in order to allow for an amount of light intensity to be distributed across the user's view that would be annoying if the same energy was concentrated in a single point source. Polarizer 206, which is situated in front of lens 214, operates as a second filter which ameliorates the effects of specular reflection at the cornea that would otherwise obfuscate the underlying structure of eye 216. More specifically, light emerging from polarizer 206 will have a particular sense of rotation. When this light hits a specularly reflecting surface (e.g., the cornea) the light that is reflected back will still be polarized, but have a reversed sense. This reversed sense light will not be passed back through polarizer 206 and is thereby blocked to the view of imager 200. However, light hitting diffusely reflecting parts of the eye (e.g., the iris) will scatter the impinging light and this light will be passed back through polarizer 206 and subsequently be available for image formation. It should be noted that, strictly speaking, circular polarization is accomplished via linear polarization followed by a quarter wave retarder; therefore, it is necessarily tuned for only a particular wavelength range.

As shown in FIG. 2, both larger and smaller square edges 208 and 210 are centered in position with respect to the axis of lens 214, with larger square edge 208 being displaced a relatively shorter distance in front of polarizer 206 and smaller square edge 210 being displaced a relatively longer distance in front of polarizer 206. These square edges 208 and 210 are useful as an alignment mechanism for the purpose of permitting the user to self-position his or her eye 216 into the field of view of imager 200 without the need for any physical contact with the system. The goal for positioning is to constrain the three translational degrees of freedom of the object to be imaged (i.e., eye 216) so that it is centered on the sensor array (not shown) of imager 200 and at a distance that lies in the focal plane of lens 214. This is accomplished by simple perspective geometry to provide cues to the user so that he or she can maneuver to the point in space that satisfies these conditions. In particular, as shown by dashed lines 220, due to perspective, there is only one spatial position of eye 216 in which the square outline contour of smaller square edge 210 will totally occlude the square outline contour of larger square edge 208. This spatial position is a substantially longer distance in front of polarizer 206 than is smaller square edge 208. The relative sizes and distances between square edges 208 and 210 are chosen so that when the eye is appropriately positioned, their square contours overlap and misalignment of the smaller and larger square edges 208 and 210 provides continuous feedback for the user regarding the accuracy of the current position of alignment of his or her eye. This alignment procedure may be referred to as Vernier alignment in analogy with the human's Vernier acuity, the ability to align thin lines and other small targets with hyperprecision.

Further, while both larger and smaller edges 208 and 210 of the preferred embodiment shown in FIG. 2 have square outline contour shapes, it should be understood that the outline contour of these larger and smaller edges may have geometrically similar shapes other than square, such that, when the eye is appropriately positioned, their geometrically similar contours overlap and misalignment of the smaller and larger edges provides continuous feedback for the user regarding the accuracy of the current position of alignment of his or her eye.

In any case, imager 200, which receives a precisely focused light-intensity image (having negligible specular-reflection noise) of the user's eye 216, derives successive video frames of this eye image. Frame grabber 212 (which is a standard digital frame grabber) stores the eye image defined by a selected one of the video frames. This stored eye image from frame grabber 212 is then forwarded to means 102 (shown in FIG. 2) for iris localization.

For illustrative purposes, assume that the user is either attempting access to a secure facility or, alternatively, attempting access to an ATM. In either case, the user, after first employing square edges 208 and 210 in the manner described above to self-position his or her eye 216 into the field of view of imager 200 without the need for any physical contact with the system, then may push a button (not shown) causing frame grabber 212 to store the eye image defined by the currently-occurring video frame derived from imager 200. Thus, the operation of pushing the button by the user is similar to that of a user operating the shutter of a still camera to record a snapshot of a scene on the film of the still camera.

Figure 2A:
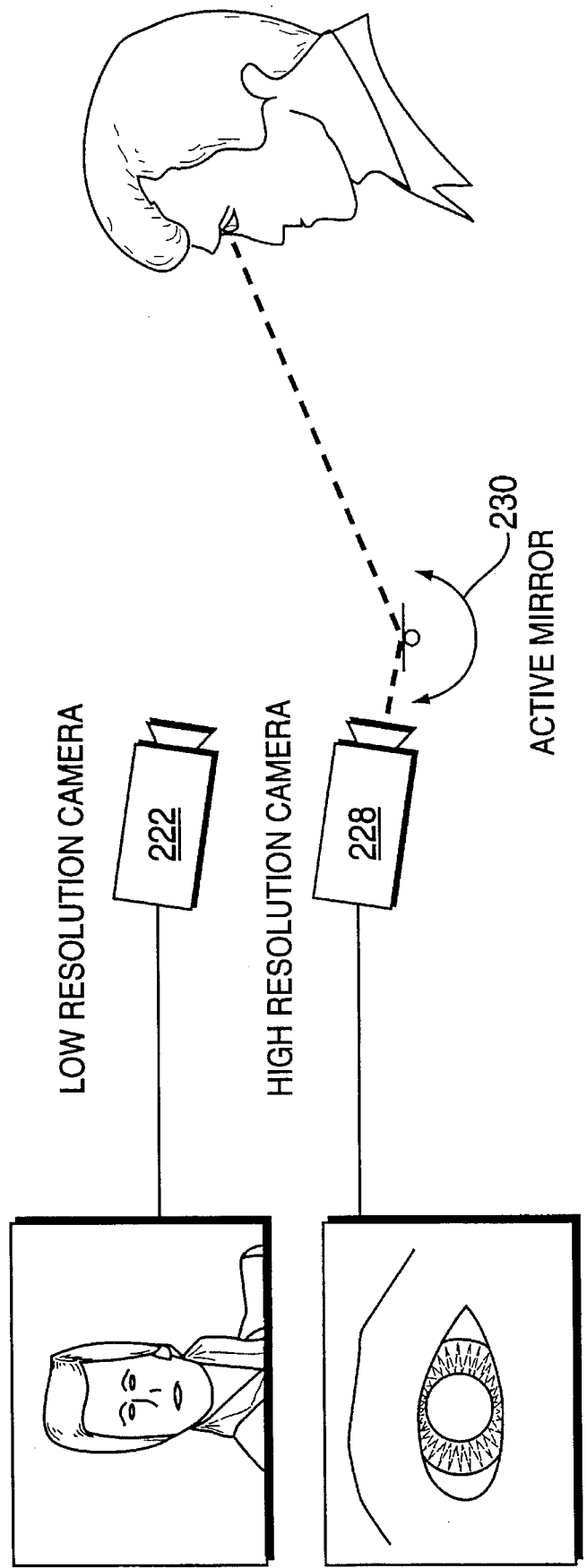
FIGS. 2a and 2b together illustrate a modification of the iris acquisition means of FIG. 2 for enhancing the embodiment thereof.
Figure 2B:
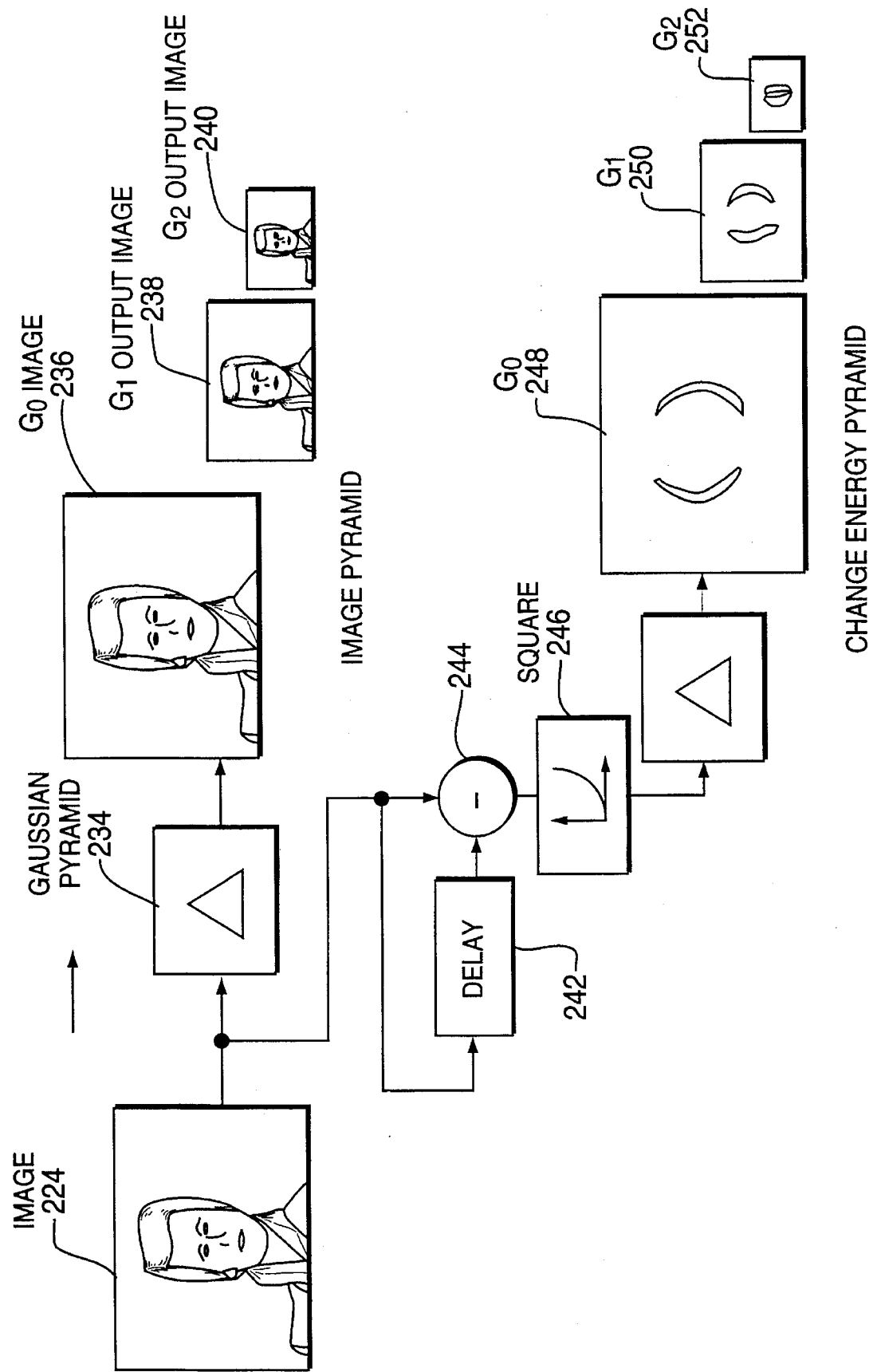

The structure shown in FIG. 2 and described above constitutes a basic embodiment of iris acquisition means 100. However, because different users vary in size and facial features from one another, it is desirable to enhance the structure of iris acquisition means 100 so that the position of the image of any user's eye viewed by the imager and stored by the frame grabber is independent of that user's particular size and facial features, for ease of use and to provide for the possibility of covert image capture. Further, in controlling access to a secure facility, it is desirable to provide video camera surveillance of the area in the general vicinity that a user employs to self-position his or her eye into the field of view of the imager, as well as to provide additional visual information that can be used to identify a user attempting access. FIGS. 2a and 2b together illustrate a modification of the structure of means 100 that provides such enhancements.

As shown in FIG. 2a, the modification of the structure of iris acquisition means 100 includes low-resolution imager 222 having a relatively wide field of view for deriving image 224 of at least the head of user 226 then attempting access. The modification also includes high-resolution imager 228 having a relatively narrow field of view that is controlled by the position of active mirror 230 for deriving image 232 of an eye of user 226 (where imager 228 corresponds to imager 200 of FIG. 2). Image processing means of the type shown in FIG. 2b, described below, uses information contained in successive video frames of imager 222 to control the adjustment of the position of active mirror 230 in accordance with prior-art teachings disclosed in one or more of U.S. Pat. No. 4,692,806, issued to Anderson et al. on Sep. 8, 1987; U.S. Pat. No. 5,063,603, issued to Burt on Nov. 19, 1991; and U.S. Pat. No. 5,067,014, issued to Bergen et al. on Sep. 8, 1987, all of which are incorporated herein by reference.

More specifically, the modification of iris acquisition means 100 involves active image acquisition and tracking of the human head, face and eye for recognizing the initial position of an operator's head (as well as its component facial features, e.g., eyes and iris) and subsequent tracking. The approach utilized by the modification, which makes use of image information derived by imager 222, decomposes the matter into three parts. The first part is concerned with crude localization and tracking of the head and its component features. The second part is concerned with using the crude localization and tracking information to zoom in on and refine the positional and temporal estimates of the eye region, especially the iris. The third part is concerned with motion tracking.

The first part of eye localization is a mechanism for alerting the system that a potential user is present, and also for choosing candidate locations where the user might be. Such an alerting mechanism is the change-energy pyramid, shown in FIG. 2b (discussed in more detail below), where images recorded at a time interval are differenced and squared. Change energy at different resolutions is produced using a Gaussian pyramid on the differenced, squared images. Change is analyzed at coarse resolution, and if present can alert the system that a potential user is entering the imagers field of view. Other alerting mechanisms include stereo, where the proximity of the user is detected by computing disparity between two images recorded from two positions, and alerting the system to objects that are nearby.

The second part of eye localization is a mechanism for initially localizing the head and eyes of the user. Localization is performed using a pattern-tree which comprises a model of a generic user, for example, a template of a head at a coarse resolution, and templates for the eyes, nose and mouth. The alerting mechanism gives candidate positions for a template matching process that matches the image with the model. Initially matching is done at a coarse resolution to locate coarse features such as the head, and subsequently fine resolution features, such as the eyes, nose and mouth, are located using information from the coarse resolution match.

The third part of eye localization is to track the head and eyes once in view. This is done using a motion tracker which performs a correlation match between a previous image frame and the current frame. The correlation match is done on the features used for eye localization, but can also be performed on other features, such as hair, that are useful for tracking over short time intervals, but vary from person to person.

The result of the three previous parts provides the location of the eye in image 224 from imager 222 and, if stereo is used, the approximate range of the eye. This information is used by active mirror 230 to point imager 228 toward the eye to capture an image. Given the position of the eye in the image 224, its approximate range, and a known geometry between imager 222 and the imager 228, the pointing direction to capture the eye using imager 228 can be easily computed. If the range of the eye is unknown, then imager 228 is pointed to a position corresponding to the approximate expected range, from which it points to positions corresponding to ranges surrounding the expected range. If imager 228 and imager 222 are configured to be optically aligned, then only the image location of the eye in image 224 is necessary to point imager 228. Once imager 228 has been initially pointed to the eye, images from imager 228 are used to keep the eye in the field of view. This is to compensate for eye saccades, and normal movement of the user. Such movements will appear insignificant in images, such as image 224, from imager 222, but will appear significant in images, such as image 232, from imager 228. The tracking procedure is the same as that described for tracking the head and eyes, except the features used in images, such as image 232, of the user's eye are the eye's pupil, limbal boundary, and texture corresponding to the eyelid.

Referring to FIG. 2b, there is shown a functional block diagram of an image processor responsive to images from imager 222 for controlling the position of active mirror 230 so that image 232 of the eye of user 226 is in the view of imager 228.

Specifically, the video signal output from imager 222, representing successive frames of image 224, is applied, after being digitized, as an input $G_0$ to Gaussian pyramid 234. Input $G_0$ is forwarded, with suitable delay, to an output of Gaussian pyramid 234 to provide a $G_0$ image 236 of an image pyramid at the same resolution and sampling density as image 224. Further, as known in the pyramid art, Gaussian pyramid 234 includes cascaded convolution and sub-sampling stages for deriving reduced-resolution $G_1$ output image 238 and $G_2$ output image 240 of the image pyramid as outputs from Gaussian pyramid 234.

The respective $G_0$, $G_1$, and $G_2$ outputs of Gaussian pyramid 234 are delayed a given number of one or more frame periods by frame delay 242. Subtractor 244 provides the difference between the polarized amplitude of corresponding pixels of the current and frame-delayed frames of each of $G_0$, $G_1$, and $G_2$ as an output therefrom, thereby minimizing the amplitude of stationary image objects with respect to the amplitude of moving object images. This minimization is magnified and polarity is eliminated by squaring the output from subtractor 244 (as indicated by block 246) to provide a $G_0$, $G_1$, and $G_2$ change energy pyramid (as indicated by respective blocks 248, 250 and 252). The change energy pyramid information, in a coarse-to-fine process known in the art, may then be used to control the position of active mirror 230 of FIG. 2a.

In addition, the modification may employ template matching, such as taught in aforesaid U.S. Pat. No. 5,063,603, for object recognition. Alternatively, crude localization and tracking could be based on a feature-based algorithm, such as disclosed in aforesaid U.S. Pat. No. 4,692,806, rather than template matching to provide similar information. Further, the modification could operate in an opportunistic fashion by acquiring a sequence of images until one with quality adequate for subsequent operations has been obtained. Alternatively, from such a sequence, pieces of the region of interest could be acquired across frames and subsequently mosaiced together to yield a single image of adequate quality. Also, any of these modification approaches could be used to zoom in on and acquire high resolution images of facial features other than the eye and iris. For example, high resolution images of the lips of an operator could be obtained in an analogous fashion.

The system of the iris acquisition means shown in FIG. 2, either with or without the enhancement provided by the modification of FIGS. 2a and 2b, could be generalized in a number of ways. First, the system could operate in spectral bands other than the visible (e.g., near infrared). Thus, the term "light", as used herein, includes light radiation in both the visible and nonvisible spectral bands. In order to accomplish this, the spectral distribution of the illuminant as well as the wavelength tuning of the quarter wave retarder must be matched to the desired spectral band. Second, the system could make use of a standard video camera (replacing the low light level camera), although a more intense illuminant would need to be employed. Third, other choices could be made for the lens system, including the use of an auto-focus zoom lens. This addition would place less of a premium on the accuracy with which the user deploys the Vernier alignment procedure. Fourth, other instantiations of the Vernier alignment procedure could be used. For example, pairs of lights could be projected in such a fashion that they would be seen as a single spot if the user is in the correct position and double otherwise. Fifth, in place of (or in addition to) the passive Vernier alignment mechanism, the system could be coupled with an active tracking imager and associated software (such as that described above in connection with FIGS. 2a and 2b) that automatically locates and tracks the eye of the user. This generalization would place less of a premium on having a cooperative user.

Figure 3:
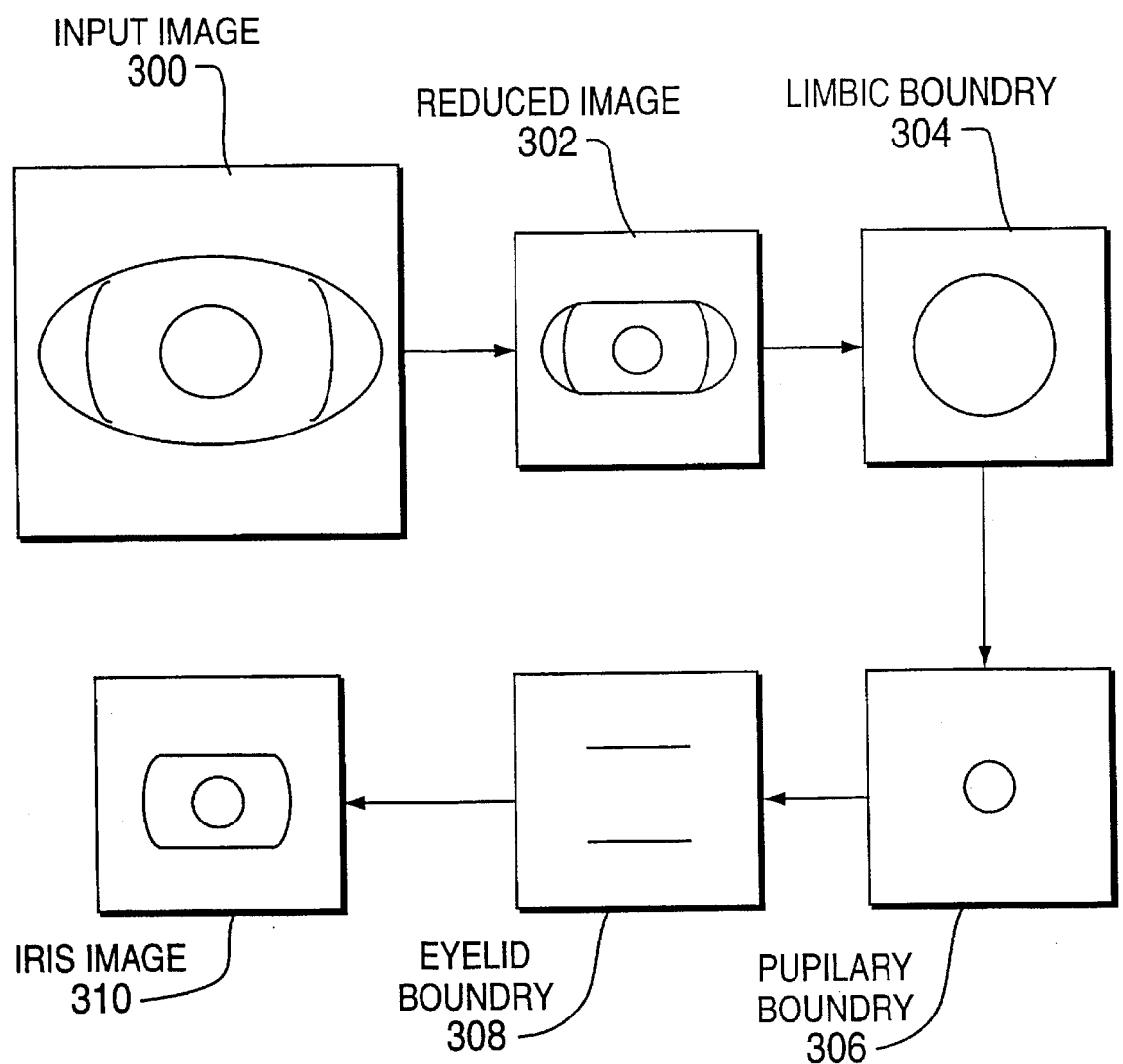
FIG. 3 illustrates the flow of computational steps employed by the invention for automatically processing an input image of an iris to provide complete iris localization.

The output from iris acquisition means 100, which is applied as an input to iris localization means 102, comprises data in digital form that defines a relatively high-resolution eye image that corresponds to the particular video frame stored in frame grabber 212. FIG. 3 diagrammatically shows the sequence of the successive data processing steps performed by iris localization means 102 on the eye image data applied as an input thereto.

More specifically, input image 300 represents the relatively high-resolution eye image data that is applied as an input to iris localization means 102 from iris acquisition means 100. The first data processing step 302 is to average and reduce input image 300. This is accomplished by convolving the data defining input image 300 with a low-pass Gaussian filter that serves to spatially average and thereby reduce high frequency noise. Since spatial averaging introduces redundancy in the spatial domain, the filtered image is next subsampled without any additional loss of information. The subsampled image serves as the basis for subsequent processing with the advantage that its smaller dimensions and lower resolution leads to fewer computational demands compared to the original, full size, input image 300.

The next data processing steps involved in localizing the iris consist of the sequential location of various components of the iris boundary. In sequence, step 304 locates the limbic (or outer) boundary of the iris, step 306 locates the pupilary (or inner) boundary of the iris, and step 308 locates the boundaries of the eyelids (which might be occluding a portion of the iris). This ordering has been chosen based on the relative salience of the involved image features as well as on the ability of located components to constrain the location of additional components. The localization step of each component is performed in two sub-steps. The first sub-step consists of an edge detection operation that is tuned to the expected configuration of high contrast image locations. This tuning is based on generic properties of the boundary component of interest (e.g., orientation) as well as on specific constraints that are provided by previously isolated boundary components. The second sub-step consists of a scheme where the detected edge pixels vote to instantiate particular values for a parameterized model of the boundary component of interest. Most simply, this step can be thought of in terms of a generalized tough transform as disclosed in U.S. Pat. No. 3,069,654, issued to P. V. C. Hough on Dec. 18, 1962, incorporated by reference.

In more detail, for the limbic boundary in step 304, the image is filtered with a gradient-based edge detector that is tuned in orientation so as to favor near verticality. This directional selectivity is motivated by the fact that even in the face of occluding eyelids, the left and right portions of the limbus should be clearly visible and oriented near the vertical. (This assumes that the head is in an upright position). The limbic boundary is modeled as a circle parameterized by its two center coordinates, xc and yc, and its radius, r. The detected edge pixels are thinned and then histogrammed into a three-dimensional (xc, yc, r)-space, according to permissible (xc, yc, r) values for a given (x, y) image location. The (xc, yc, r) point with the maximal number of votes is taken to represent the limbic boundary. The only additional constraint imposed on this boundary is that it lies within the given image of the eye.

In more detail, for the pupilary boundary in step 306, the image is filtered with a gradient-based edge detector that is not directionally tuned. The pupilary boundary is modeled as a circle, similar to the limbic boundary. The parameters of the circle again are instantiated in terms of the most number of votes received as the edge pixels are thinned and then histogrammed into permissible (xc,yc,r) values. For the case of the pupil the permissible parameter values are constrained to lie within the circle that describes the limbic boundary.

In more detail, for the eyelid boundaries in step 308, the image is filtered with a gradient-based edge detector that is tuned in orientation so as to favor the horizontal. This directional selectivity is motivated by the fact that the portion of the eyelid (if any) that is within the limbic boundary should be nearly horizontal. (Again, this assumes that the head is upright). The upper and lower eyelids are modeled as (two separate) parabolic, i.e., second-order, arcs. Particular values for the parameterization are instantiated as the detected edge pixels are thinned and then histogrammed according to their permissible values. For the eyelids case, the detected boundaries are additionally constrained to be within the circle that specifies the limbic boundary and above or below the pupil for the upper and lower eyelids, respectively.

Finally, with the various components of the iris boundary isolated, the final processing step 310 consists of combining these components so as to delimit the iris, per se. This is accomplished by taking the iris as that portion of the image that is outside the pupil boundary, inside the limbic boundary, below the upper eyelid and above the lower eyelid.

The above-described approach to iris localization could be generalized in a number of ways. First, image representations other than oriented gradient-based edge detection could be used for enhancing iris boundaries. Second, alternative parameterizations for the iris boundary could be employed. Third, localization of various components of the iris boundary (limbic, pupilary and eyelid boundaries) could be performed in different orders, or in parallel. Fourth, alternative constraints, including absence of constraints, could be enforced in specifying the relative configuration of the components of the iris boundary. Fifth, the fit of the parameterized models of the iris boundary could be performed across multiple resolutions, e.g., in an iterative coarse-to-fine fashion. Sixth, iris boundary localization could be performed without the initial steps of spatial averaging and subsampling.

The benefit of the above-described approach to iris localization of an input eye image (particularly, as exemplified by the sequential data processing steps shown in FIG. 3) is that it requires no additional initial conditions and that it can be implemented employing simple filtering operations (that enhance relevant image structures) and histogramming operations (that embodies a voting scheme for recovering the iris boundaries from the enhanced image) that incur little computational expense.

As shown in FIG. 1, the processed data output from iris localization means 102, representing the image of solely the localized iris of the user, is applied as a first input to pattern matching means 104, while selected data, previously stored in a database, that represents a model of the image of solely the localized iris 106 of the person whom the user purports to be is applied as a second input to pattern matching means 104. Means 104 employs principles of the invention to efficiently process the first and second input data thereto to determine whether or not there is a match sufficient to indicate the user is, in fact, the person whom he or she purports to be.

More specifically, the distinctive spatial characteristics of the human iris are manifest at a variety of scales. For example, distinguishing structures range from the overall shape of the iris to the distribution of tiny crypts and detailed texture. To capture this range of spatial structures, the iris image is represented in terms of a 2D bandpass signal decomposition. Preliminary empirical studies lead to the conclusion that acceptable discrimination between iris images could be based on octave-wide bands computed at four different resolutions that are implemented by means of Laplacian pyramids to capture this information. This makes for efficient storage and processing as lower frequency bands are subsampled successively without loss of information.

In order to make a detailed comparison between two images it is advantageous to establish a precise correspondence between characteristic structures across the pair. An area-based image registration technique is used for this purpose. This technique seeks the mapping function (u(x,y),v(x,y)), such that, for all (x,y), the pixel value at (x,y)-(u(x,y),v(x,y)) in the data image is close to that at (x,y) in the model image. Here, (x,y) are taken over the image regions that are localized as the iris by the iris localization technique described herein. Further, the mapping function is constrained to be a similarity transformation, i.e., translational shift, scale and rotation. This allows the observed degrees of freedom between various imaged instances of the same iris to be compensated for. Shift accounts for offsets in the plane parallel to the imager's sensor array. Scale accounts for offsets along the camera's optical axis. Rotation accounts for deviation in rotation about the optical axis beyond that not naturally compensated for by cyclotorsion of the eye. Given the ability to accurately position the person attempting access, as described above in connection with image acquisition, these prove to be the only degrees of freedom that need to be addressed in establishing correspondence. This approach has been implemented in terms of a hierarchical gradient-based image registration algorithm employing model-based motion estimation known in the art. Initial conditions for the algorithm are derived from the relative offset of iris boundaries located by the iris localization technique described above.

With the model and data images accurately and precisely registered, the next task is to assign a goodness of match to quantify the comparison. Given the system's ability to bring model and data images into fine registration, an appropriate match metric can be based on integrating pixel differences over spatial position within each frequency band of the image representation. Spatial correlation captures this notion. More specifically, normalized correlation is made use of. Normalized correlation captures the same type of information as standard correlation; however, it also accounts for local variations in image intensity that corrupt standard correlation, as known in the art. The correlations are performed over small blocks of pixels (8× 8) in each spatial frequency band. A goodness of match subsequently is derived for each band by combining the block correlation values via the median statistic. Blocking combined with the median operation allows for local adjustments of matching and a degree of outlier detection and thereby provides robustness against mismatches due to noise, misregistration and occlusion (e.g., a stray eyelash).

The final task that must be performed is to combine the four goodness of match values that have been computed (one for each spatial frequency band) into a final judgment as to whether the data image comes from the same iris as does the model image. A reasonable approach to this matter is to combine the values in a fashion so that the variance within a class of iris images (i.e., various instances of the same iris) is minimized, while the variance between different classes of iris images (i.e., instances of different irises) is maximized. A linear function that provides such a solution is well known and is given by Fisher's Linear Discriminant. This technique has been disclosed, among others, by Duda and Hart in "Pattern Classification And Scene Analysis", John Wiley & Sons, 1973, pages 1114–118. While it is not a foregone conclusion that any linear function can properly distinguish different classes of arbitrary data sets, it has been found that, in practice, it works quite well in the case of iris images. Further, in practice, Fishers Linear Discriminant, has been defined based on a small set of iris image training data comprising 5 images of 10 irises). Subsequently, in practice, this function has made for excellent discrimination between incoming data images that have a corresponding database entry and those that do not.

It is to be understood that the apparatus and method of operation taught herein are illustrative of the invention. Modifications may readily be devised by those skilled in the art without departing from the spirit or scope of the invention. In particular, methods of registration other than similarity may be used. Image representations other than those derived via application of isotropic bandpass filtering could serve as the basis for correlation. For example, oriented bandpass filtering, such as that disclosed by Burt et al in U.S. Pat. No. 5,325,449 issued Jun. 28, 1994, incorporated herein by reference, or morphological filtering could be used. Other signal decomposition methods than bandpass such as wavelet decomposition can be used. A wavelet decomposition is a specific type of multiresolution pyramid that uses quadrature mirror filters (QMF) to produce subband decompositions of an original image representative video signal. A signal processor of this type is described by Pentland et al. in "A Practical Approach to Fractal-Based Image Compression", Proceedings of the DCC '91 Data Compression Conference, Apr. 8–11, 1991, IEEE Computer Society Press, Los Alamitos, Calif. The Pentland et al. compression system attempts to use low frequency coarse scale information to predict significant information at high frequency finer scales. QMF subband pyramid processing also is described in the book "Subband Image Coding", J. W. Woods, ed., Kluwer Academic Publishers, 1991. Alternatively, an oriented bandpass such as that disclosed by Burt et al in U.S. Pat. No. 5,325,449 issued Jun. 28, 1994, could be used.

Image matching could be performed in a more symbolic fashion. For example, multiple derived match values could be combined in manners other than those given by Fisher's Linear Discriminant. For example, a non-linear combination (e.g., derived with a neural network) could be used. Other comparison methods than correlation and other decision criteria than Fisher's Linear Discriminant can also be used.

Alternative methods could be used for aligning the irises that are being compared. For example, the images can be aligned subject to either simpler or more complex image transformations. Prior to the actual matching procedure the annular iris images could be converted to a rectangular format, e.g., with radial and angular position converted to vertical and horizontal. Such manipulation would serve to simplify certain subsequent operations. Prior to the actual matching procedure the iris images could be projected along some direction to yield a one-dimensional signal. For example, the images could be projected along the radial directions.

The invention can be used to control access to an area, facility or a device such as computer or an ATM or in biometric assessment.

We claim:

1. In a system including an imager having a lens for deriving a focused image of an eye of a user of the system; the improvement comprising:
    alignment means for permitting said user to self-position his or her eye into said imager's field of view without the need for any physical contact with said system, said alignment means comprises:
    (a) first edge means having a given outline contour shape of a first given size that is substantially centered with respect to said lens, said first edge means being disposed a first distance in front of said lens; and
    (b) second edge means having an outline contour shape of a second given size smaller than said first given size that is geometrically similar in shape to said given outline contour shape and is substantially centered with respect to said lens, said second edge means being disposed a second distance in front of said lens that is longer than said first distance by a specified amount, said specified amount being such that said lens forms a focused image of said user's eye when said user's eye is maneuvered to a point in space in front of said lens at which said outline contour of said first edge means is substantially totally occluded by said outline contour of said second edge means as viewed by said user's eye from the point.

2. The system of claim 1, wherein:
    said given outline contour shape of said first edge means is square;
    whereby said geometrically similar outline contour shape of said second edge means is also square.

3. The system of claim 1, wherein said system further comprises:
    light means for illuminating said user's eye with diffuse light which is circularly polarized in a given sense of rotation to derive diffusely reflected light from said user's eye that is incident on said lens.

4. The system of claim 3, wherein said light means comprises:
    an array of light sources which surround said imager for deriving illuminating light;
    a diffuser panel through which said illuminating light from said array of light sources passes prior to reflection from the user's eye, said diffuser panel having a hole therein situated with respect to said lens for permitting said reflected light to reach said lens without passing through said diffuser panel; and
    a circular polarizer situated in front of said diffuser panel and said lens for circularly polarizing the illuminating light reaching said user's eye in said given sense of rotation.

5. The system of claim 3, further comprising:
    a digital frame grabber coupled to said imager for deriving digital data representative of said focused image of said eye of a user.

6. The system of claim 1, wherein said imager is a relatively high-resolution, narrow-field imager and said alignment means further comprises:
    a relatively low-resolution, wide field imager for deriving successive video frames of image information that includes predetermined facial features of said user;
    image processing means responsive to said predetermined-facial-feature image information for locating the position of said user's eye in said video frames thereof; and
    means associated with said image processing means which is responsive to the location of the position of said user's eye in said video frames of said low-resolution, wide field imager for permitting said high-resolution, narrow field imager to be provided with a focused image of said user's eye.

7. The system of claim 6, wherein:
    said means associated with said image processing means includes an active mirror positioned in accordance with said located position of said user's eye in said video frames of said relatively low-resolution, wide field imager.

8. The system of claims 6, wherein said imaging processing means includes:
    a Gaussian pyramid for deriving a multistage image pyramid of at least one of said successive video frames of image information; and
    means responsive to said image-pyramid stages for deriving a change energy pyramid.

9. In a system including an imager having a lens for deriving a focused image of an eye of a user of the system to examine the iris of said user's eye, the improvement comprising:
    alignment means for permitting said user to self-position his or her eye into said imager's field of view without the need for any physical contact with said system;
    a digital frame grabber coupled to said imager for deriving digital data representative of said focused image of said user's eye;

image processing means responsive to the digital data from said frame grabber that manifests said user's eye for localizing the iris of said eye by, in sequential order, (1) locating that data which is within the image of the user's eye that defines the limbic boundary of said iris, (2) locating that data which is within said limbic boundary that defines the pupilary boundary of said iris, (3) locating that data which is within said limbic boundary that defines the boundaries of the upper and lower eyelids of said eye, and (4) then employing that data that is outside of said pupilary boundary, inside said limbic boundary, and below the upper eyelid and above the lower eyelid thereby to delimit said data to that portion thereof which manifests the iris of said eye, the image processing means comprising:

(a) gradient-based edge detector filter means tuned in orientation to favor near verticality for deriving detected edge data; and (b) means, responsive to said limbic boundary being modeled as a circle parameterized by its two center coordinates, xc and yc, and its radius, r, for thinning and then histogramming said detected edge data into a three-dimensional (xc, yc, r)-space, according to permissible (xc, yc, r) values for a given (x, y) image location; whereby the (xc, yc, r) point with the maximal number of votes is taken to represent the limbic boundary.

10. In a system including an imager having a lens for deriving a focused image of an eye of a user of the system to examine the iris of said user's eye, the improvement comprising:

alignment means for permitting said user to self-position his or her eye into said imager's field of view without the need for any physical contact with said system;

a digital frame grabber coupled to said imager for deriving digital data representative of said focused image of said user's eye;

image processing means responsive to the digital data from said frame grabber that manifests said user's eye for localizing the iris of said eye by, in sequential order, (1) locating that data which is within the image of the user's eye that defines the limbic boundary of said iris, (2) locating that data which is within said limbic boundary that defines the pupilary boundary of said iris, (3) locating that data which is within said limbic boundary that defines the boundaries of the upper and lower eyelids of said eye, and (4) then employing that data that is outside of said pupilary boundary, inside said limbic boundary, and below the upper eyelid and above the lower eyelid thereby to delimit said data to that portion thereof which manifests the iris of said eye, the image processing means comprising:

(a) gradient-based edge detector filter means that is directionally untuned in orientation for deriving detected edge data; and (b) means, responsive to said pupilary boundary being modeled as a circle parameterized by its two center coordinates, xc and yc, and its radius, r, for thinning and then histogramming said detected edge data into a three-dimensional (xc, yc,r)-space, according to permissible (xc, yc,r) values for a given (x, y) image location;

whereby the (xc, yc, r) point with the maximal number of votes is taken to represent the pupilary boundary.

11. In a system including an imager having a lens for deriving a focused image of an eye of a user of the system to examine the iris of said user's eye, the improvement comprising:

alignment means for permitting said user to self-position his or her eye into said imager's field of view without the need for any physical contact with said system;

a digital frame grabber coupled to said imager for deriving digital data representative of said focused image of said user's eye;

image processing means responsive to the digital data from said frame grabber that manifests said user's eye for localizing the iris of said eye by, in sequential order, (1) locating that data which is within the image of the user's eye that defines the limbic boundary of said iris, (2) locating that data which is within said limbic boundary that defines the pupilary boundary of said iris, (3) locating that data which is within said limbic boundary that defines the boundaries of the upper and lower eyelids of said eye, and (4) then employing that data that is outside of said pupilary boundary, inside said limbic boundary, and below the upper eyelid and above the lower eyelid thereby to delimit said data to that portion thereof which manifests the iris of said eye, the image processing means comprising:

(a) gradient-based edge detector filter means tuned in orientation to favor the horizontal for deriving detected edge data; and (b) means, responsive to each of said upper eyelid boundary and said lower eyelid boundary of said eye being modeled as a parabolic parameterized by second-order arcs, in which particular values for the parameterization are instantiated by thinning and then histogramming said detected edge data into a three-dimensional space, according to permissible values for a given image location;

whereby the spatial point with the maximal number of votes is taken to represent that eyelid boundary.

12. In a system directed to automated iris recognition for security access control including (1) an imager having a lens for deriving a focused image of an eye of a user of the system and (2) a digital frame grabber coupled to said imager for deriving digital data representative of said focused image of said user's eye, the improvement comprising:

alignment means for permitting said user to self-position his or her eye into the field of view of said imager without the need for any physical contact with said system; and image processing means including:

(a) iris-localizing means responsive to digital data from said frame grabber that manifests said user's eye for substantially delimiting said digital data to only that portion thereof which manifests solely the iris of said user's eye; and (b) pattern-matching means, responsive to said portion of said digital data and previously stored digital data which manifests solely the iris of an eye of a given individual, said pattern-matching means employing normalized spatial correlation, for:

(1) first comparing, at each of a plurality of spatial scales, each of distinctive spatial characteristics of the respective irises of said user and said given individual that are spatially registered with one another to quantitatively determine, at each of said plurality of spatial scales, a goodness value of match at that spatial scale, and then (2) judging whether or not the pattern of said delimited digital data which manifests solely said iris of said user's eye matches said digital data which manifests solely the iris of the eye of said given individual in accordance with a certain combination of the quantitatively-determined goodness values of match at each of said plurality of spatial scales, the pattern matching means comprising:

area-based image registration means utilizing a mapping function (u(x,y),v(x,y)) constrained to be a similarity transformation of translational shift, scale and rotation, such that, for all (x,y), the data value at (x,y)-(u(x,y),v(x,y)) in the delimited digital data which manifests solely said iris of said user's eye is close to that at (x,y) of said digital data which manifests solely the iris of the eye of said given individual.

13. In a system directed to automated iris recognition for security access control including (1) an imager having a lens for deriving a focused image of an eye of a user of the system and (2) a digital frame grabber coupled to said imager for deriving digital data representative of said focused image of said user's eye, the improvement comprising:

alignment means for permitting said user to self-position his or her eye into field of view of said imager without the need for any physical contact with said system; and image processing means including:

(a) iris-localizing means responsive to digital data from said frame grabber that manifests said user's eye for substantially delimiting said digital data to only that portion thereof which manifests solely said iris of said user's eye; and (b) pattern-matching means, responsive to said portion of said digital data and previously stored digital data which manifests solely the iris of an eye of a given individual, said pattern-matching means employing normalized spatial correlation, for:

(1) first comparing, at each of a plurality of spatial scales, each of distinctive spatial characteristics of the respective irises of said user and said given individual that are spatially registered with one another to quantitatively determine, at each of said plurality of spatial scales, a goodness value of match at that spatial scale, and then (2) judging whether or not the pattern of said delimited digital data which manifests solely said iris of said user's eye matches said digital data which manifests solely the iris of the eye of said given individual in accordance with a certain combination of the quantitatively-determined goodness values of match at each of said plurality of spatial scales, the pattern matching means comprising:

means for combining the quantitatively-determined goodness values of match at each of said plurality of spatial scales so that the variance within various instances of the same iris is minimized and the variance within various instances of different irises is maximized.

14. The system of claim 13, wherein:

said means for combining the quantitatively-determined goodness values of match at each of said plurality of spatial scales employs Fisher's Linear Discriminant as a linear function that minimizes the variance among various instances of the same iris and maximizes the variance among various instances of different irises.

15. In an image-processing method responsive to digital data defining a digitized image of the eye of an individual for delimiting said digital data to that portion thereof that defines the iris of said eye of said individual to the relative exclusion of other components of the eye of the individual, said method comprising the steps of:

a delimiting step of locating that data which is within the image of said individual's eye that define the limbic boundary of said iris, the pupilary boundary of said iris, and the boundaries of the upper and lower eyelids of said eye, the delimiting step includes the sequential steps of:

(a) first, locating that portion of said digital data that defines the limbic boundary of said iris, step (a) includes the steps of:

(i) employing gradient-based edge detector filter means tuned in orientation to favor near verticality for detecting edge data; and (ii) thinning and then histogramming said detected edge data into a three-dimensional (xc, yc, r)-space, according to permissible (xc, yc, r) values for a given (x, y) image location in accordance with a model of said limbic boundary as a circle parameterized by its two center coordinates, xc and yc, and its radius r, the histogramming step embodies a voting scheme which produces votes for recovering said limbic boundary;

whereby the (xc, yc, r) point with the maximal number of the votes is taken to represent the limbic boundary;

(b) second, locating that portion of said digital data which is within said limbic boundary that defines the pupilary boundary of said iris;

(c) third, locating that portion of said digital data which is within said limbic boundary that defines the boundaries of the upper and lower eyelids of said eye; and (d) fourth, employing only that portion of said digital data that is outside of said pupilary boundary, inside said limbic boundary, and below the upper eyelid and above the lower eyelid thereby to delimit said digital data to that portion thereof which manifests said iris of said eye;

the delimiting step further includes the steps of:

(e) image-filtering said one of the limbic boundary of said iris, the pupilary boundary of said iris, and the boundaries of said upper and lower eyelids to derive an enhanced image thereof; and (f) histogramming said enhanced image, in which said histogramming step embodies the voting scheme for recovering one of the boundaries of the iris from said enhanced image;

whereby said recovery of said one of the boundaries of said iris does not require knowledge of any initial conditions other than the digital data defining said digitized image of said eye of said individual.

16. In an image-processing method responsive to digital data defining a digitized image of the eye of an individual for delimiting said digital data to that portion thereof that defines the iris of said eye of said individual to the relative exclusion of other components of the eye of the individual; said method comprising the steps of:

a delimiting step of locating that data which is within the image of said individual's eye that define the limbic boundary of said iris, the pupilary boundary of said iris, and the boundaries of the upper and lower eyelids of said eye, the delimiting step includes the sequential steps of:

(a) first, locating that portion of said digital data that defines the limbic boundary of said iris;

(b) second, locating that portion of said digital data which is within said limbic boundary that defines the pupilary boundary of said iris;

(c) third, locating that portion of said digital data which is within said limbic boundary that defines the boundaries of the upper and lower eyelids of said eye; and (d) fourth, employing only that portion of said digital data that is outside of said pupilary boundary, inside said limbic boundary, and below the upper eyelid and above the lower eyelid thereby to delimit said digital data to that portion thereof which manifests said iris of said eye, step (d) includes the steps of:

(i) employing gradient-based edge detector filter means that is directionally untuned in orientation for detecting edge data; and (ii) thinning and then histogramming said detected edge data into a three-dimensional (xc, yc, r)-space, according to permissible (xc, yc, r) values for a given (x, y) image location in accordance with a model of said pupilary boundary as a circle parameterized by its two center coordinates, xc, and yc, and its radius r, the histogramming step embodies a voting scheme which produces votes for recovering said limbic boundary;

whereby the (xc, yc, r) point with the maximal number of the votes is taken to represent the pupilary boundary;

the delimiting step further includes the steps of:

(e) image-filtering said one of the limbic boundary of said iris, the pupilary boundary of said iris, and the boundaries of said upper and lower eyelids to derive an enhanced image thereof; and (f) histogramming said enhanced image, in which said histogramming step embodies the voting scheme for recovering one of the boundaries of the iris from said enhanced image;

whereby said recovery of said one of the boundaries of the iris does not require knowledge of any initial conditions other than the digital data defining said digitized image of said eye of said individual.

17. In an image-processing method responsive to digital data defining a digitized image of an eye of an individual for delimiting said digital data to that portion thereof that defines solely the iris of said eye of said individual; wherein said method includes a delimiting step of locating that data which is within the image of said individual's eye that defines at least one of the limbic boundary of said iris, the pupilary boundary of said iris, and the boundaries of upper and lower eyelids of said eye; said delimiting step comprising the steps of:

a) image-filtering said one of the limbic boundary of said iris, the pupilary boundary of said iris, and the boundaries of said upper and lower eyelids to derive an enhanced image thereof;

b) histogramming said enhanced image, in which said histogramming step embodies a voting scheme for recovering said one of said iris boundaries from said enhanced image;

said delimiting step further including the sequential steps of:

c) first, locating that portion of said digital data that defines said limbic boundary of said iris;

d) second, locating that portion of said digital data which is within said limbic boundary that defines said pupilary boundary of said iris;

e) third, locating that portion of said digital data which is within said limbic boundary that defines said boundaries of said upper and lower eyelids of said eye by:

(1) employing gradient-based edge detector filter means tuned in orientation to favor the horizontal for detecting edge data; and (2) thinning and then histogramming said detected edge data into a three-dimensional space, according to permissible values for a given image location in accordance with a model of each of the upper eyelid boundary and the lower eyelid boundary as a parabolic parameterized by second-order arcs;

whereby the spatial point with the maximal number of votes is taken to represent that eyelid boundary; and f) fourth, employing only that portion of said digital data that is outside of said pupilary boundary, inside said limbic boundary, and below the upper eyelid and above the lower eyelid thereby to delimit said digital data to that portion thereof which manifests the iris of the eye;

whereby said recovery of said one of said iris boundaries does not require knowledge of any initial conditions other than the digital data defining said digitized image of said eye of said individual.

18. In an image-processing method for use in providing automated iris recognition for security access control; said method being responsive to first digital data defining a digitized image of the iris of the eye of a certain individual to the relative exclusion of other components of the eye of the certain individual attempting access and previously stored second digital data of a digitized image that defines the iris of the eye of a specified individual to the relative exclusion of other components of the eye of the specified individual; said method comprising the steps of:

a pattern-matching step which comprises the steps of:

a) employing normalized spatial correlation for first comparing, at each of a plurality of spatial scales, each of distinctive spatial characteristics of the respective irises of said given individual and said specified individual that are spatially registered with one another to quantitatively determine, at each of said plurality of spatial scales, a goodness value of match at that spatial scale; and b) judging whether or not the pattern of said digital data which manifests said iris of said eye of said given individual matches said digital data which manifests the iris of an eye of said specified individual in accordance with a certain combination of the quantitatively-determined goodness values of match at each of said plurality of spatial scales.

19. In an image-processing method for use in providing automated iris recognition for security access control; said method being responsive to first digital data defining a digitized image of solely the iris of the eye of a certain individual attempting access and previously stored second digital data of a digitized image that defines solely the iris of the eye of a specified individual; said method comprising the steps of:

a pattern-matching step which comprises the steps of:

a) employing normalized spatial correlation for first comparing, at each of a plurality of spatial scales, each of distinctive spatial characteristics of the respective irises of said given individual and said specified individual that are spatially registered with one another to quantitatively determine, at each of said plurality of spatial scales, a goodness value of match at that spatial scale, where step a) comprises the step of:

employing area-based image registration utilizing a mapping function (u(x,y),v(x,y)) constrained to be a similarity transformation of translational shift, scale and rotation, such that, for all (x,y), the data value at (x,y)-(u(x,y),v(x,y)) in the first digital data which manifests solely said iris of said eye of said given individual is close to that at (x,y) of said second digital data which manifests solely the iris of the eye of said specified individual;

b) judging whether or not the pattern of said digital data which manifests solely said iris of said eye of said given individual matches said digital data which manifests solely the iris of an eye of said specified individual in accordance with a certain combination of the quantitatively-determined goodness values of match at each of said plurality of spatial scales.

20. The method of claim 18, wherein step (a) comprises the step of:

c) performing normalized spatial correlation over given spatial blocks made up of a first plurality of data points in a first spatial dimension of each of said plurality of scales and a second plurality of data points in a second spatial dimension of each of said plurality of scales.

21. The method of claim 20, wherein step (c) comprises the step of:

d) combining said normalized spatial correlation over said given spatial blocks via a median statistic at each of said plurality of spatial scales for quantitatively determining said goodness value of match at that spatial scale.

22. In an image-processing method for use in providing automated iris recognition for security access control; said method being responsive to first digital data defining a digitized image of solely the iris of the eye of a certain individual attempting access and previously stored second digital data of a digitized image that defines solely the iris of the eye of a specified individual; said method comprising the steps of:

a pattern-matching step which comprises the steps of:

a) employing normalized spatial correlation for first comparing, at each of a plurality of spatial scales, each of distinctive spatial characteristics of the respective irises of said given individual and said specified individual that are spatially registered with one another to quantitatively determine, at each of said plurality of spatial scales, a goodness value of match at that spatial scale;

b) judging whether or not the pattern of said digital data which manifests solely said iris of said eye of said given individual matches said digital data which manifests solely the iris of an eye of said specified individual in accordance with a certain combination of the quantitatively-determined goodness values of match at each of said plurality of spatial scales by combining the quantitatively-determined goodness values of match at each of said plurality of spatial scales so that the variance within various instances of the same iris is minimized and the variance within various instances of different irises is maximized.

23. The method of claim 22, wherein step (c) comprises the step of:

d) employing Fisher's Linear Discriminant as a linear function that minimized the variance among various instances of the same iris and maximizes the variance amount various instances of different irises.

24. In a system directed to automated iris recognition for security access control including (1) an imager having a lens for deriving a focused image of an eye of a user of the system and (2) a digital frame grabber coupled to said imager for deriving digital data representative of said focused image of said user's eye, the improvement comprising:

alignment means for permitting said user to self-position his or her eye into said imager's field of view without the need for any physical contact with said system; and image processing means including:

(a) iris-localizing means responsive to digital data from said frame grabber that manifests said user's eye for substantially delimiting said digital data to only that portion thereof which manifests said iris of said user's eye to the relative exclusion of other components of the user's eye; and (b) pattern-matching means, responsive to said portion of said digital data and previously stored digital data which manifests the iris of an eye of a given individual to the relative exclusion of other components of the eye of the individual, said pattern-matching means employing normalized spatial correlation, for:

(1) first comparing, at each of a plurality of spatial scales, each of distinctive spatial characteristics of the respective irises of said user and said given individual that are spatially registered with one another to quantitatively determine, at each of said plurality of spatial scales, a goodness value of match at that spatial scale, and then (2) judging whether or not the pattern of said delimited digital data which manifests said iris of said user's eye matches said digital data which manifests the iris of the eye of said given individual in accordance with a certain combination of the quantitatively-determined goodness values of match at each of said plurality of spatial scales.

25. The system of claim 1, further comprising an imaging path between the imager and the user's eye, wherein the first edge means and the second edge means are positioned outside of the imaging path.

26. In a system directed to automated iris recognition for security access control including (1) an imager having a lens for deriving a focused image of an eye of a user of the system and (2) a digital frame grabber coupled to said imager for deriving digital data representative of said focused image of said user's eye, the improvement comprising:

image processing means including:

(a) iris-localizing means responsive to digital data from said frame grabber that manifests said user's eye for substantially delimiting said digital data to that portion thereof which manifests said iris of said user's eye to the relative exclusion of other components of the user's eye; and (b) pattern-matching means, responsive to said portion of said digital data and previously stored digital data which manifests the iris of an eye of a given individual to the relative exclusion of other components of the eye of the given individual, said pattern-matching means employing normalized spatial correlation, for:

(1) first comparing, at each of a plurality of spatial scales, each of distinctive spatial characteristics of the respective irises of said user and said given individual that are spatially registered with one another to quantitatively determine, at each of said plurality of spatial scales, a goodness value of match at that spatial scale, and then (2) judging whether or not the pattern of said delimited digital data which manifests said iris of said user's eye matches said digital data which manifests the iris of the eye of said given individual in accordance with a certain combination of the quantitatively-determined goodness values of match at each of said plurality of spatial scales, the pattern matching means comprising:

area-based image registration means utilizing a mapping function $(u(x,y),v(x,y))$ constrained to be a similarity transformation of translational shift, scale and rotation, such that, for all $(x,y)$, the data value at $(x,y)-(u(x,y),v(x,y))$ in the delimited digital data which manifests said iris of said user's eye is close to that at $(x,y)$ of said digital data which manifests the iris of an eye of said given individual.

27. In a system directed to automated iris recognition for security access control including (1) an imager having a lens for deriving a focused image of an eye of a user of the system and (2) a digital frame grabber coupled to said imager for deriving digital data representative of said focused image of said user's eye, the improvement comprising:

image processing means including:

(a) iris-localizing means responsive to digital data from said frame grabber that manifests said user's eye for substantially delimiting said digital data to only that portion thereof which manifests said iris of said user's eye to the relative exclusion of other components of the user's eye; and (b) pattern-matching means, responsive to said portion of said digital data and previously stored digital data which manifests the iris of an eye of a given individual to the relative exclusion of other components of the eye of the given individual, said pattern-matching means employing normalized spatial correlation, for:

(1) first comparing, at each of a plurality of spatial scales, each of distinctive spatial characteristics of the respective irises of said user and said given individual that are spatially registered with one another to quantitatively determine, at each of said plurality of spatial scales, a goodness value of match at that spatial scale, and then (2) judging whether or not the pattern of said delimited digital data which manifests said iris of said user's eye matches said digital data which manifests the iris of the eye of said given individual in accordance with a certain combination of the quantitatively-determined goodness values of match at each of said plurality of spatial scales, the pattern matching means comprising:

means for combining the quantitatively-determined goodness values of match at each of said plurality of spatial scales so that the variance within various instances of the same iris is minimized and the variance within various instances of different irises is maximized.

28. In an image-processing method responsive to digital data defining a digitized image of an eye of an individual for delimiting said digital data to that portion thereof that defines the iris of said eye of said individual to the relative exclusion of other components of the eye of said individual; wherein said method includes a delimiting step of locating that data which is within the image of said individual's eye that defines at least one of the limbic boundary of said iris, the pupilary boundary of said iris, and the boundaries of upper and lower eyelids of said eye; said delimiting step comprising the steps of:

a) image-filtering said one of the limbic boundary of said iris, the pupilary boundary of said iris, and the boundaries of said upper and lower eyelids to derive an enhanced image thereof;

b) histogramming said enhanced image, in which said histogramming step embodies a voting scheme for recovering said one of said iris boundaries from said enhanced image;

said delimiting step further including the sequential steps of:

c) first, locating that portion of said digital data that defines said limbic boundary of said iris;

d) second, locating that portion of said digital data which is within said limbic boundary that defines said pupilary boundary of said iris;

e) third, locating that portion of said digital data which is within said limbic boundary that defines said boundaries of the upper and lower eyelids of said eye by:

(1) employing gradient-based edge detector filter means tuned in orientation to favor the horizontal for detecting edge data; and (2) thinning and then histogramming said detected edge data into a three-dimensional space, according to permissible values for a given image location in accordance with a model of each of said upper eyelid boundary and lower eyelid boundary as a parabolic parameterized by second-order arcs;

whereby the spatial point with the maximal number of votes is taken to represent that eyelid boundary; and f) fourth, employing that portion of said digital data that is outside of said pupilary boundary, inside said limbic boundary, and below the upper eyelid and above the lower eyelid thereby to delimit said digital data to that portion thereof which manifests the iris of said eye;

whereby said recovery of said one of said iris boundaries does not require knowledge of any initial conditions other than the digital data defining said digitized image of said eye of said individual.

29. In an image-processing method for use in providing automated iris recognition for security access control; said method being responsive to first digital data defining a digitized image of the iris of the eye of a certain individual to the relative exclusion of other components of the eye of said certain individual attempting access and previously stored second digital data of a digitized image that defines the iris of the eye of a specified individual to the relative exclusion of other components of the eye of said specified individual; said method comprising the steps of:

a pattern-matching step which comprises the steps of:

a) employing normalized spatial correlation for first comparing, at each of a plurality of spatial scales, each of distinctive spatial characteristics of the respective irises of said given individual and said specified individual that are spatially registered with one another to quantitatively determine, at each of said plurality of spatial scales, a goodness value of match at that spatial scale, using area-based image registration utilizing a mapping function $(u(x,y),v(x,y))$ constrained to be a similarity transformation of translational shift, scale and rotation, such that, for all $(x,y)$, the data value at $(x,y)-(u(x,y),v(x,y))$ in the first digital data which manifests said iris of said eye of said given individual is close to that at $(x,y)$ of said second digital data which manifests the iris of the eye of said specified individual;

b) judging whether or not the pattern of said digital data which manifests said iris of said eye of said given individual matches said digital data which manifests the iris of an eye of said specified individual in accordance with a certain combination of the quantitatively-determined goodness values of match at each of said plurality of spatial scales.

30. In an image-processing method for use in providing automated iris recognition for security access control; said method being responsive to first digital data defining a digitized image of the iris of the eye of a certain individual to the relative exclusion of other components of the eye of said specified individual attempting access and previously stored second digital data of a digitized image that defines the iris of the eye of a specified individual to the relative exclusion of other components of the eye of said specified individual, said method comprising the steps of:

a pattern-matching step which comprises the steps of:
  a) employing normalized spatial correlation for first comparing, at each of a plurality of spatial scales, each of distinctive spatial characteristics of the respective irises of said given individual and said specified individual that are spatially registered with one another to quantitatively determine, at each of said plurality of spatial scales, a goodness value of match at that spatial scale;
  b) judging whether or not the pattern of said digital data which manifests said iris of said eye of said given individual matches said digital data which manifests the iris of an eye of said specified individual in accordance with a certain combination of the quantitatively-determined goodness values of match at each of said plurality of spatial scales by combining the quantitatively-determined goodness values of match at each of said plurality of spatial scales so that the variance within various instances of the same iris is minimized and the variance within various instances of different irises is maximized.

31. The system of claim 24, wherein:

said pattern-matching means includes means for performing normalized spatial correlation over given spatial blocks made up of a first plurality of data points in a first spatial dimension of each of said plurality of scales and a second plurality of data points in a second spatial dimension of each of said plurality of scales.

32. The system of claim 31, wherein:

said pattern-matching means includes means combining said normalized spatial correlation over said given spatial blocks via a median statistic at each of said plurality of spatial scales for quantitatively determining said goodness value of match at that spatial scale.

\* \* \* \* \*